United States Patent [19]

Yabushita

[11] Patent Number: 5,389,315
[45] Date of Patent: Feb. 14, 1995

[54] METHOD AND DEVICE FOR MOLD PRESS FORMING

[75] Inventor: Shozo Yabushita, Kanagawa, Japan

[73] Assignee: Kasai Kogyo Co., Ltd., Tokyo, Japan

[21] Appl. No.: 43,047

[22] Filed: Apr. 5, 1993

[30] Foreign Application Priority Data

Nov. 4, 1992 [JP] Japan ................... 4-295244

[51] Int. Cl.⁶ ............... B29C 45/28; B29C 45/76
[52] U.S. Cl. ................. 264/40.1; 264/328.7;
264/328.8; 425/145; 425/560; 425/562;
425/573; 425/575
[58] Field of Search ............ 264/40.1, 40.5, 328.7,
264/328.8, 328.12, 2.2; 425/145, 557, 558, 560,
562, 567, 573, 575, 587

[56] References Cited

U.S. PATENT DOCUMENTS

| | | | |
|---|---|---|---|
| 2,840,856 | 7/1958 | Moxness | 264/328.8 |
| 4,364,878 | 12/1982 | Laliberte et al. | 264/2.2 |
| 4,595,552 | 6/1986 | Hahn . | |
| 4,846,651 | 7/1989 | Matsuda et al. | 425/145 |
| 5,057,255 | 10/1991 | Sato et al. | 425/145 |

FOREIGN PATENT DOCUMENTS 380215 8/1990 European Pat. Off. .
506218 9/1992 European Pat. Off. .
2129348 1/1973 Germany ................... 264/328.8

*Primary Examiner*—Jill L. Heitbrink
*Attorney, Agent, or Firm*—Dickstein, Shapiro & Morin

[57] ABSTRACT

In a method and device for mold press forming involving distribution of molten resin within a mold including a plurality of valve gates, deformation of the product and generation of excessive burrs and voids are prevented by accurately distributing a prescribed amount of resin material to each valve gate by detecting the amount of molten resin supplied from an injection unit and controlling the opening timing and period of each valve gate. The amount of molten resin supplied from the injection unit can be conveniently evaluated by detecting the displacement of an in-line screw used in the injection unit. By providing a metering arrangement for each of the valve gates, the molten resin can be even more accurately distributed to each of the valve gates.

14 Claims, 5 Drawing Sheets

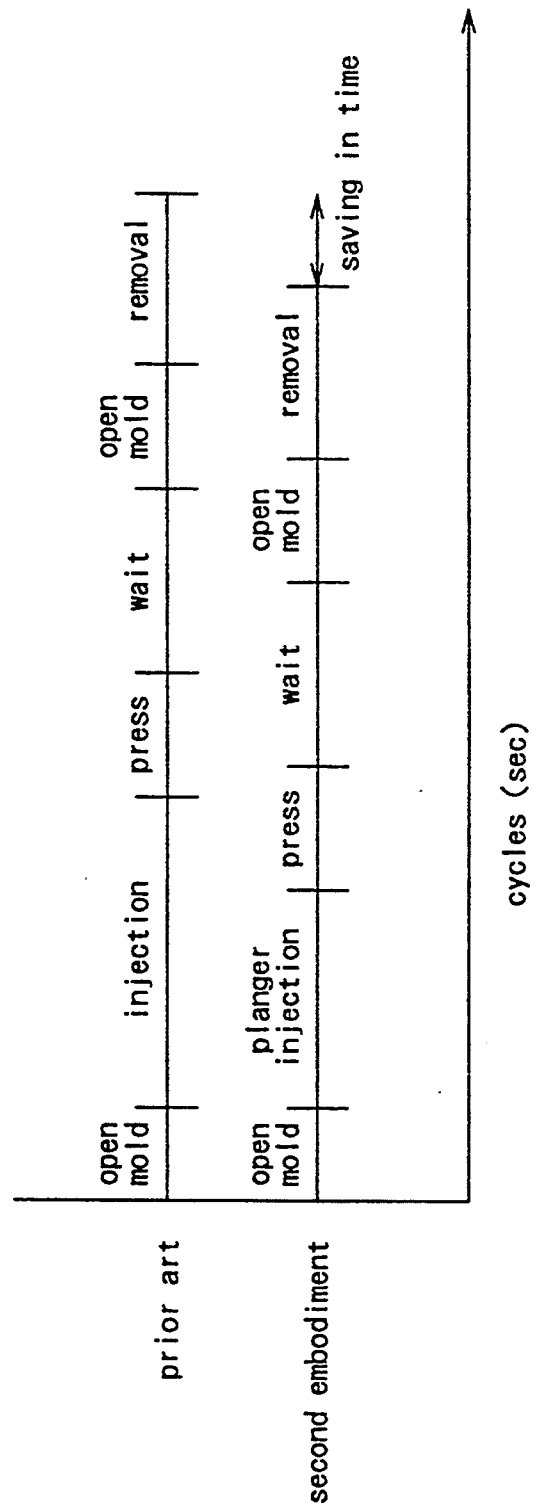

5,389,315

METHOD AND DEVICE FOR MOLD PRESS FORMING

TECHNICAL FIELD

The present invention relates to a method and device for mold press forming, and in particular to such a method and device for mold press forming suitable for use in producing automotive upholstery members and other parts which can be used in the interior of an automotive passenger compartment.

BACKGROUND OF THE INVENTION

As a process for forming automotive upholstery members, the mold press forming process has been widely employed. According to the mold press forming process, resin in semi-molten state is distributed to the upper and lower dies for mold press forming, and the upper and lower dies are closed upon each other, so that the shapes of the molded members can be freely selected, and the material loss can be minimized.

In this mold press forming process, as illustrated in FIG. 7, resin material is molded between upper and lower dies 1 and 2 for mold press forming which can be closed upon each other with a prescribed pressure and are provided with prescribed die surfaces, and the material is supplied to the dies from an injection molding machine 3 connected to the lower die 1.

More specifically, as illustrated in FIG. 8, molten resin is supplied to a hot runner 5 provided in a manifold passed inside the lower die 1 from a nozzle 4 of the injection molding machine 3, and is distributed to the die surface of the lower die 1 via a plurality of valve gates 6 branching off from the hot runner 5. The so-called multi-point gate method is most widely used in which a plurality of such valve gates 6 are distributed over the die surface.

According to the mold press forming process based on the multi-point valve gate method, it is necessary to control the amount of resin that is supplied to each of the valve gates 6a, 6b and 6c according to the shape and thickness of the product, and various methods have been practiced for this purpose. According to the temperature control method, the amount of resin is controlled by changing the set temperature of each of the valve gates 6. According to another method, the amount of resin supplied to each of the valve gates is controlled by using a timer.

Normally, the opening and closing timing of each of the valve gates 6a, 6b and 6c is controlled according to a timing chart such as the one illustrated in FIG. 9 for the purpose of supplying a prescribed amount of resin to each of a plurality of locations in the lower die 10.

Thus, according to the conventional method for mold press forming based on the use of valve gates, for instance, if a timer control is employed, the opening period of the valve gates can be controlled by the order of 0.1 seconds, but due to the change in the flow resistance in the hot runner 5 the amount of resin supplied from each of the valve gates cannot be accurately controlled, and it is known that some unevenness in the amounts of resin supplied to different locations of the die surface often occurs.

This is caused by the fact that the fluidity of the molten resin tends to differ from one gate to another due to the unevenness in the temperature distribution in the hot runner, and that the presence of residual unmolten resin in the gates, in particular at the time of start-up, and the introduction of foreign matters into the molten resin tend to cause unevenness in the fluidicity of the molten resin, and may even cause the blockage of part of the gates.

Therefore, the resulting difficulty in controlling the thickness of the product sometimes caused warping of the product, excessive generation of burrs, and creation of voids.

Further, the thermal capacity of the product in relation with a surface skin member placed on the product could not be properly controlled, and unevenness in the thermal capacity tends to impair the external appearance of such a surface skin member when it is placed over the surface of the molded product to form an integral assembly.

BRIEF SUMMARY OF THE INVENTION

In view of such problems of the prior art, a primary object of the present invention is to provide a method and device for mold press forming which can effectively prevent deformation of the molded product by accurately controlling the supply of molten resin to each of the gates distributed to a plurality of points in the die surface.

A second object of the present invention is to provide a method and device for mold press forming which can eliminate such problems as excessive burrs, voids and unattractive appearances.

A third object of the present invention is to provide a method and device for mold press forming which can complete injection of resin material into the mold cavity with a minimum amount of time.

According to the present invention, these and other objects of the present invention can be accomplished by providing a method for mold press forming for forming molten resin into a desired shape, comprising the steps of: distributing molten resin to a plurality of valve gates provided in a mold; detecting an amount of the molten resin supplied from injection means to the mold; opening and closing the valve gates according a detected amount of the molten resin supplied from the injection means to the mold; and closing the mold to form the molten resin to a shape corresponding to a mold surface of the mold. The amount of the molten resin supplied from the injection means can be conveniently evaluated by detecting the position of a moveable member of the injection means, such as an in-line screw of an injection molding machine.

Thus, the valve gates are sequentially opened one after the other under the control of the control unit according to the amount of molten resin supplied from the injection means so that the amount of the resin supplied through each of the gates may be individually controlled, and deformation of the product and generation of excessive burrs and voids can be effectively prevented, thereby allowing high quality molded products to be obtained.

To the end of accurately metering the molten resin supplied to each of the valve gates, the valve gates may be opened one after the other substantially without any overlap between opening periods of the valve gates. If desired, the temperature of the molten resin can be controlled for each of the valve gates. If the time required for injecting molten resin into the mold is desired to be reduced, metering means may be provided in each of the valve gates so that the valve gates may be opened with some overlap between opening periods of at least part of the valve gates.

According to the present invention, the above mentioned method can be conveniently carried out by using a device for mold press forming for forming molten resin into a desired shape, comprising: a mold consisting of a plurality of mold sections, at least one of the mold sections being provided with a hot runner passed through the mold, and a plurality of valve gates branching off from the hot runner and each leading to a mold surface of the mold; means for opening and closing each of the valve gates; an injection unit for supplying molten resin to the hot runner, the injection unit including means for indicating an amount of molten resin supplied from the injection unit; and control unit for actuating the means for opening and closing the valve gates according to a signal supplied from the indicating means.

Each of the valve gates may be provided with metering means for individually metering molten resin supplied from a corresponding one of the valve gates so that the molten resin may be injected into the mold from the valve gates substantially simultaneously so as to reduce the time required for the entire molding process. The metering means may comprises a three-way valve having an outlet end communicated with a corresponding one of the valve gates, a first inlet end communicated with the hot runner, and a second inlet end communicated with variable volume chamber means for storing a prescribed amount of molten resin supplied from the hot runner, so that the molten resin stored therein may be supplied to the valve gate with a synchronized operation of the variable volume chamber means and the three way valve under a command from the control unit. The variable volume chamber may comprise a metering chamber having a cylindrical shape, a piston slidably received in the metering chamber, and actuating means for moving the piston so as to receive molten resin in the metering chamber when the molten resin is being supplied from the hot runner, and push the molten resin out to the valve gate when the molten resin is being supplied from the valve gate to the mold. If the stroke of the piston is made adjustable, it is possible to vary the prescribed amount of molten resin supplied to each of the valve gates.

BRIEF DESCRIPTION OF THE DRAWINGS

Now the present invention is described in the following with reference to the appended drawings, in which:

FIG. 6 is a time chart of the device illustrated in FIG. 5;

DETAILED DESCRIPTION OF THE PREFERRED EMBODIMENTS

Now the embodiments of the method and device for mold press forming according to the present invention are described in the following with reference to the appended drawings.

Figure 1:
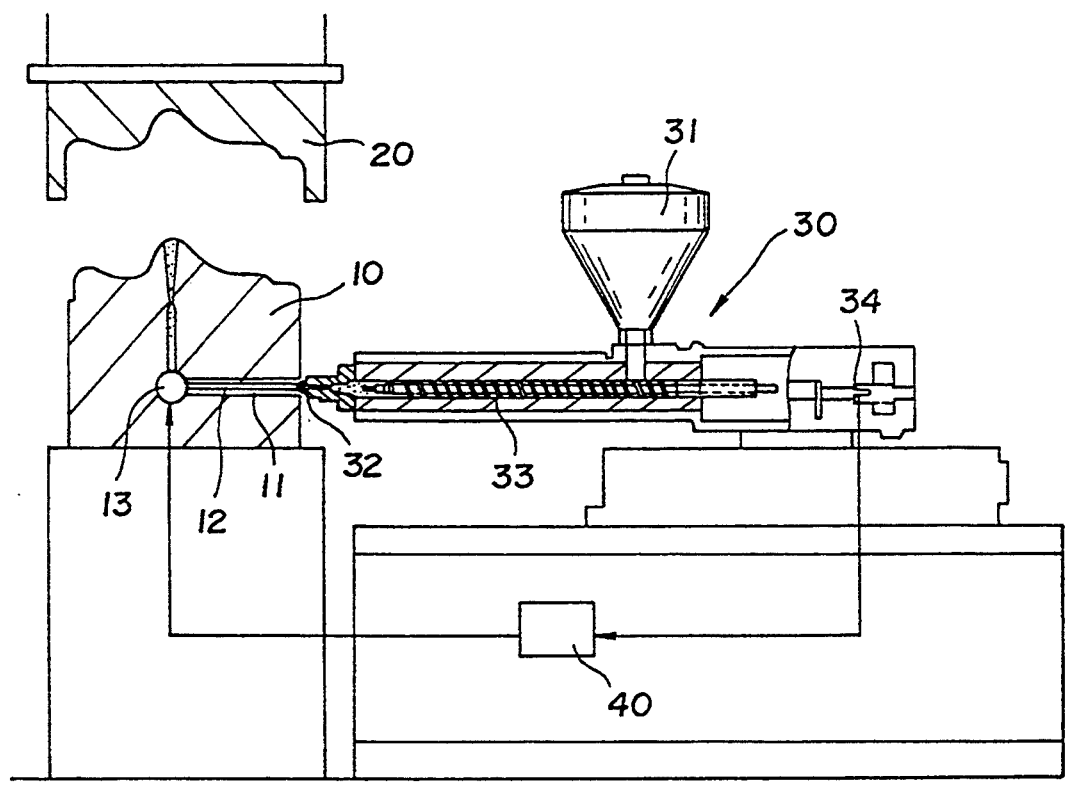
FIG. 1 is an overall view of the structure of a molding device used for carrying out a first embodiment of the method of the present invention.
Figure 2:
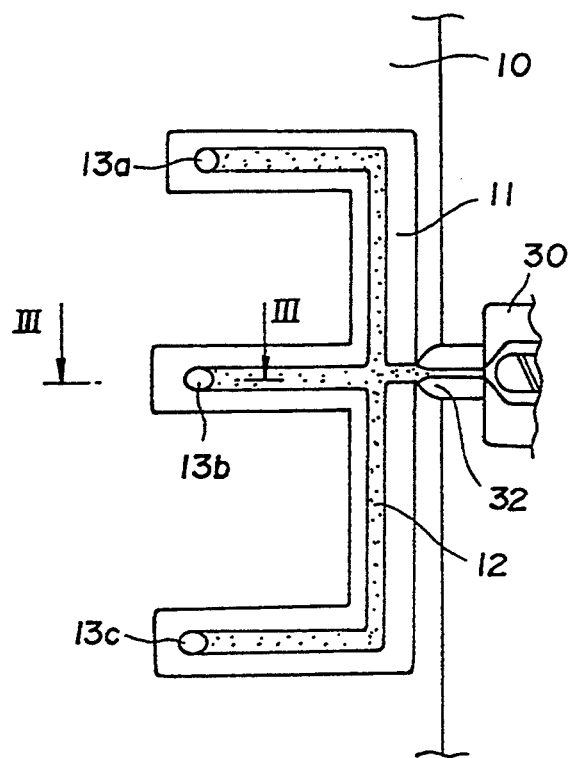
FIG. 2 is an illustrative view showing the positioning of gate valves in the molding device illustrated in FIG. 1.
Figure 3:
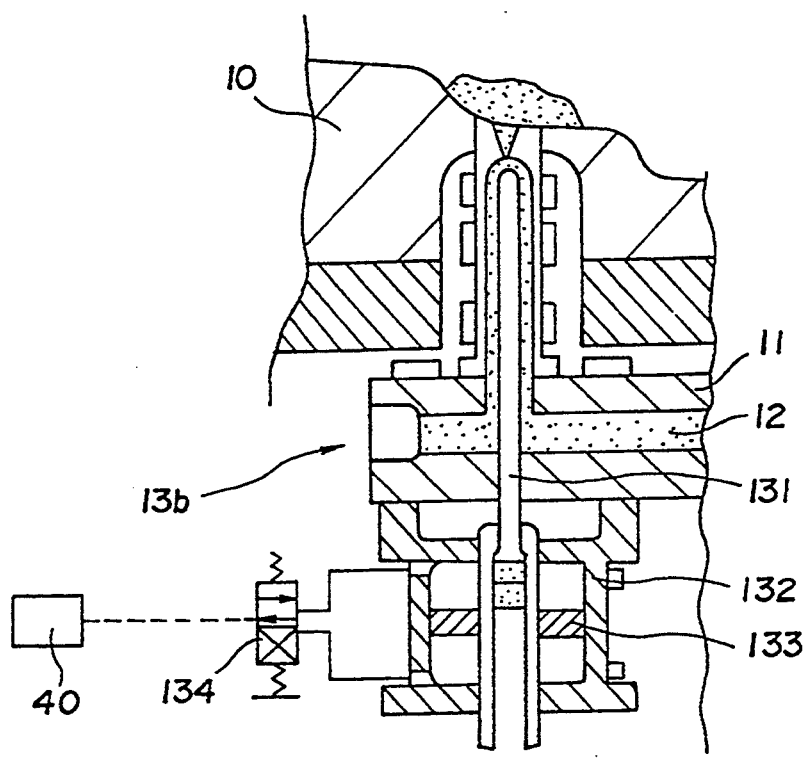
FIG. 3 is a sectional view taken along line III—III of FIG. 2.
Figure 4:
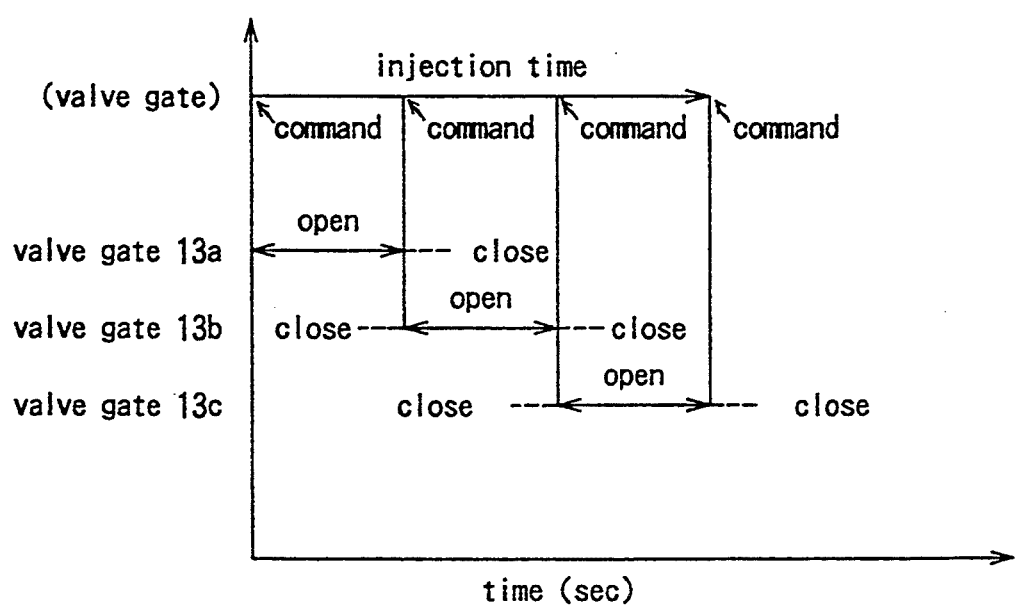
FIG. 4 is a time chart of the device illustrated in FIG. 3.
Figure 5:
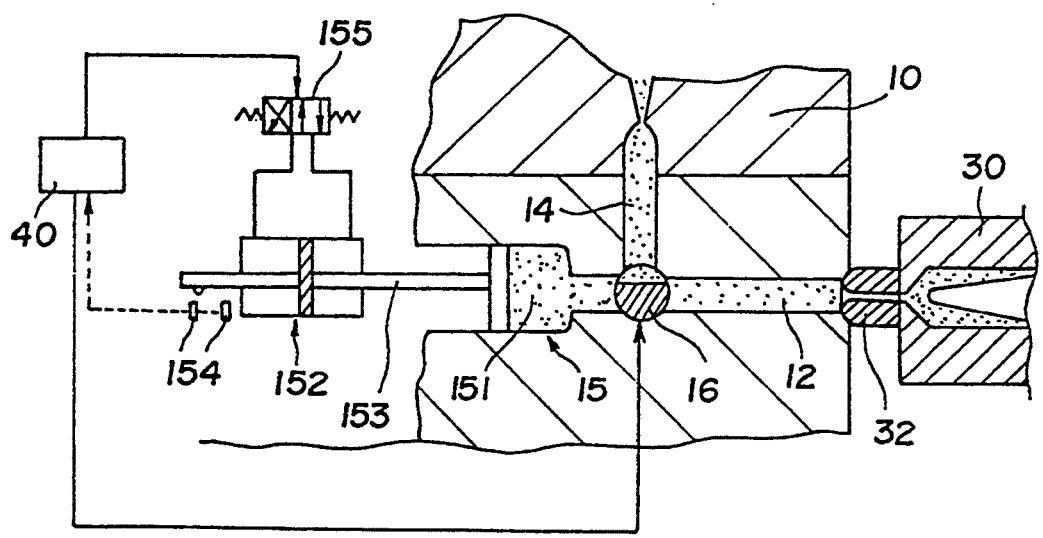
FIG. 5 is an overall view of the structure of a molding device used for carrying out a second embodiment of the method of the present invention.
Figure 9:
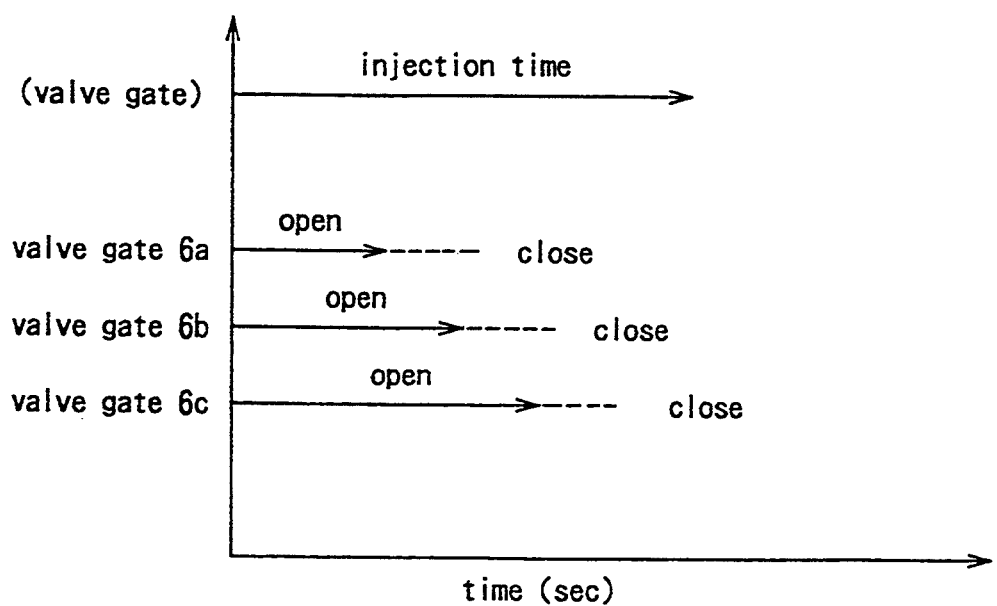
FIG. 9 is a time chart showing the opening and closing timing of valve gates in a conventional molding device of the valve gate type.
Figure 7:
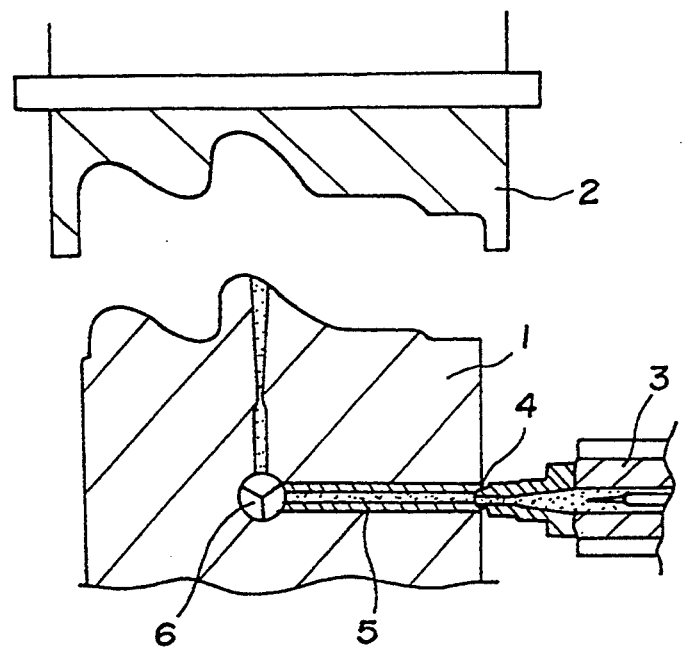
FIG. 7 is an illustrative view of the overall structure of a conventional device for mold press forming.
Figure 8:
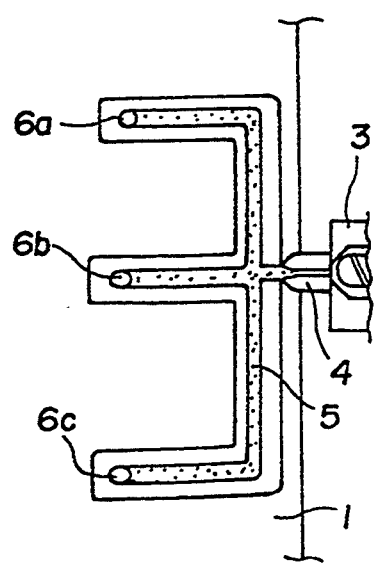
FIG. 8 is an illustrative view showing the positioning of the valve gates in the molding device illustrated in FIG. 6.

FIGS. 1 through 3 show the structure of a device used for carrying out a first embodiment of the method for mold press forming according to the present invention. FIG. 1 is a view illustrating the overall structure, FIG. 2 shows the layout of valve gates provided in a lower die, and FIG. 3 is a sectional view showing the structure of one of the valve gates. FIG. 4 is a time chart for the valve gates according to the method of the present invention, FIG. 5 is a sectional view showing a device used for carrying out a second embodiment of the method for mold press forming according to the present invention, and FIG. 6 is a time chart for the second embodiment.

Now the first embodiment is described in the following with reference to FIGS. 1 through 3.

Referring to FIG. 1, the device essentially consists of a lower die 10 serving as one of a plurality of mold sections of a mold for mold press forming, an upper die 20 serving another mold section of the mold for mold press forming which can be closed upon the lower die so as to mold press form resin material with a prescribed pressure, and an injection molding machine 30.

The resin material which is supplied from the injection molding machine 30 is distributed to prescribed locations of the lower die 10 with controlled amounts via a hot runner 12 included in a manifold 11 passed through the lower die 10 and a plurality of valve gates 13.

The injection molding machine 30 comprises a hopper 31 for supplying resin material in the form of pellets to the machine main boy, a nozzle 32 connected to the lower die 10 for supplying molten resin thereto, and an in-line screw 33 provided inside the main body for pushing the molten resin material out to the nozzle 32 by a prescribed amount with its forward feed motion.

One of the features of the present invention is found in that the amount of the resin material supplied to each of the valve gates 13 is controlled according to the displacement of the in-line screw 33 in view of the fact that the position of the in-line screw 33 can be accurately detected.

More specifically, a positional sensor 34 is installed in such a manner that the position of the in-line screw 33 can be accurately detected, and an output signal from this positional sensor 34 is supplied to a CPU 40 which in turn issues command to each of the three valve gates 13a, 13b and 13c illustrated in FIG. 3 to open and close them in a sequential manner.

As illustrated in FIG. 3 showing the structure of one of the valve gates 13, a valve gate pin 131 is received therein in a vertically moveable manner, and the lower end of the valve gate pin 131 is connected to a piston 133 received in a hydraulic cylinder 132 so that the piston 133 in the cylinder 132 may be vertically moveable in response to the opening and closing of a solenoid valve 134. The vertical movement of the piston 133 causes the vertical movement of the valve gate pin 131, and the resin material is supplied to the die surface of the lower die 10 when the valve gate pin 131 is at its lower position, but the supply of the resin material is stopped when the valve gate pin 131 is at its upper position.

The solenoid valve 134 is controlled by the CPU 40, and the control timing is determined according to the position of the in-line screw 33 of the injection molding machine 30 detected by an encoder or the like. When the position sensor 34 has detected that the in-line screw 33 has reached a prescribed position, the CPU 40 issues a command to each of the valve gates 13 to open and close it. Since the valve gates 13 are sequentially opened and closed without any overlap in the opening periods of the valve gates 13 as illustrated in the time chart of FIG. 4, as opposed to the prior art, the accuracy of the control of the resin supply capacity of each of the valve gates can be substantially improved, and the resin feeding capacity and the resin temperature can be controlled with a high level of accuracy without being affected by the change in the temperature balance of the hot runner which could be upset by a failure in the heater therefor, and excessive unevenness of the fluidicity of the molten resin. Thus, the thickness of the product can be kept uniform, and an undesirable warping can be avoided. The occurrence of burrs and voids can be also reduced.

FIG. 5 shows a second embodiment of the method according to the present invention. A primary feature of this embodiment is found in the provision of metering means 15 for metering and supplying a prescribed amount of molten resin to each of the gates 14 branching off from the hot runner 12.

As illustrated in FIG. 5, the metering means 15 is provided in the corresponding gate 14, and a prescribed amount of molten resin metered by the metering means 15 is distributed to the die surface of the lower die 10 from the gates 14 via a three-way rotary valve 16.

The structure of this metering means 15 comprises a metering chamber 151 communicating with the hot runner 12, and a plunger 153 connected to the hydraulic cylinder 152 is received in this metering chamber 151.

A sensor 154 is provided in such a manner as to detect the position of this plunger 153, and by receiving a signal from the position sensor 154 the CPU 40 issues a command to the solenoid valve 155 to actuate the hydraulic cylinder 152 and open and close the rotary valve 16.

More specifically, the resin material which is supplied into the hot runner 12 from the nozzle 32 of the injection molding machine 30 is filled into the metering chamber 151 via the rotary valve 16, as the plunger 153 receded to the left as shown in the drawing. When the plunger 153 has receded to a prescribed position, the rotary valve 16 is closed as the position sensor 154 detects the position of the plunger 153, and send a signal to this effect to the CPU 40. The CPU 40 then moves the plunger 153 to the right by opening the solenoid valve 155 and actuating the hydraulic cylinder 152, and communicates the metering chamber 151 with the gate 14 by opening the rotary valve 16 so that the resin material metered by the metering chamber 151 may be distributed to the die surface of the lower die 10 via the gate 14.

Thus, according to the present embodiment, by provision of the metering means in which a plunger 153 is provided for each of the gates 14, and the volume of the resin material to be injected is metered by the stroke of the plunger 153, the metering at each of the gates can be accomplished in a highly accurate manner. Further, it is desirable to have the stroke of the plunger or the piston at each of the metering assembly to be variable so that optimum metering conditions can be achieved at all times. In the same way as in the previous embodiment, the thickness of the product can be kept uniform, and an undesirable warping can be avoided. The occurrence of burrs and voids can be also reduced.

Further, as illustrated in FIG. 6, if the injection from each of the gates is carried out simultaneously, the time required for the entire injection process can be minimized. Additionally, if desired, the temperature control for the resin in each of the gates can be individually carried out.

As described above, the present invention has the following special advantages.

According to a certain feature of the preferred embodiment of the present invention, since the volume of the resin material distributed to each different gate is accurately controlled by detecting the advance position of the in-line screw of the injection molding machine, and sequentially opening and closing the valve gates, the thickness of the product can be made highly uniform, and the warping or other deformation of the product can be avoided, with the additional advantage of substantially preventing the generation of burrs and voids.

According to another feature of the preferred embodiment of the present invention, since the volume of the resin material distributed to each different gate is accurately controlled by detecting the advance position of the in-line screw of the injection molding machine, and sequentially opening and closing the valve gates, when a thus molded product and a surface skin member are integrally joined together by mold press forming, the surface skin member is not subjected to any adverse thermal influences from the molded product, and a favorable external appearance can be obtained.

According to yet another feature of the preferred embodiment of the present invention, by providing metering means for the resin material for each of the gates, the metering of the resin material can be accurately carried out at each of the gates, and such additional advantages as reducing the time for injection by the injection molding machine and allowing better temperature control for each gate can be accomplished.

Although the present invention has been described in terms of a specific embodiment thereof, it is possible to modify and alter details thereof without departing from the spirit of the present invention.

What we claim is:

1. A method for mold press forming, comprising the steps of:

supplying molten resin to a hot runner provided in a lower die for mold press forming via a nozzle of an injection molding machine;

distributing said molten resin to prescribed locations of said lower die via a plurality of valve gates branching off from said hot runner; and engaging an upper die for mold press forming with said lower die to form said molten resin into a desired shape;

said valve gates being sequentially opened and closed according to a command from a control unit based on a signal from a position sensor which detects a fore-and-aft position of an in-line screw of said injection molding machine such that said valve gates are opened one after the other substantially without any overlap between opening periods of said valve gates.

2. A method for mold press forming, comprising the steps of:

supplying molten resin to a hot runner provided in a lower die for mold press forming via a nozzle of an injection molding machine;

distributing said molten resin to prescribed locations of said lower die via a plurality of valve gates branching off from said hot runner; and engaging an upper die for mold press forming with said lower die to form said molten resin into a desired shape;

said valve gates being sequentially opened and closed according to a command from a control unit based on a signal from a position sensor which detects a fore-and-aft position of an in-line screw of said injection molding machine, wherein said step of distributing molten resin to a plurality of valve gates includes the step of individually metering said molten resin supplied to each of said valve gates.

3. A method for mold press forming, comprising the steps of:

supplying molten resin to a hot runner provided in a lower die for mold press forming via a nozzle of an injection molding machine;

distributing said molten resin to prescribed locations of said lower die via a plurality of valve gates branching off from said hot runner; and engaging an upper die for mold press forming with said lower die to form said molten resin into a desired shape;

metering means being provided for each of said valve gates so that a prescribed amount of said molten resin may be distributed over a die surface of said upper dies via a valve, and a rotary valve being provided for filling said molten resin into a metering chamber and distributing said molten resin from said metering chamber over a die surface of said lower die via said valve gates by a closing/opening operation of said rotary valve.

4. A method according to claim 3, wherein said valve gates are opened with some overlap between opening periods of at least part of said valve gates.

5. A method according to claim 3, wherein said step of distributing molten resin to a plurality of valve gates includes the step of individually metering said molten resin supplied to each of said valve gates.

6. A device for mold press forming for forming molten resin into a desired shape, comprising:

upper and lower dies for mold press forming which can be joined together with a prescribed compressive force and provided with prescribed die surfaces;

an injection molding machine for supplying molten resin to a hot runner passed inside said lower die;

a position sensor for detecting a fore-and-aft position of an in-line screw of said injection molding machine;

a plurality of valve gates branching off from said hot runner for distributing said molten resin to said lower die; and a control unit for receiving a signal from said position sensor and sequentially opening and closing said valve gates such that said valve gates are opened one after the other substantially without any overlap between opening periods of said valve gates.

7. A device for mold press forming for forming molten resin into a desired shape, comprising:

upper and lower dies for mold press forming which can be joined together with a prescribed compressive force and provided with prescribed die surfaces;

an injection molding machine for supplying molten resin to a hot runner passed inside said lower die;

a position sensor for detecting a fore-and-aft position of an in-line screw of said injection molding machine;

a plurality of valve gates branching off from said hot runner for distributing said molten resin to said lower die; and a control unit for receiving a signal from said position sensor and sequentially opening and closing said valve gates, wherein each of said valve gates is provided with metering means for individually metering molten resin supplied from a corresponding one of said valve gates.

8. A device according to claim 7, wherein said metering means comprises a three-way valve having an outlet end communicated with a corresponding one of said valve gates, a first inlet end communicated with said hot runner, and a second inlet end communicated with variable volume chamber means for storing a prescribed amount of molten resin supplied from said hot runner, in such a manner that said molten resin stored therein is supplied to said valve gate with a synchronized operation of said variable volume chamber means and said three way valve under a command from said control unit.

9. A device according to claim 8, wherein said variable volume chamber means comprises a metering chamber having a cylindrical shape, a piston slidably received in said metering chamber, and actuating means for moving said piston so as to receive molten resin in said metering chamber when said molten resin is being supplied from said hot runner, and push said molten resin out to said valve gate when said molten resin is being supplied from said valve gate into said mold.

10. A device according to claim 8, wherein said variable volume chamber means is provided with means for varying said prescribed amount.

11. A device for mold press forming for forming molten resin into a desired shape, comprising:

upper and lower dies for mold press forming which can be joined together with a prescribed compressive force and provided with prescribed die surfaces;

an injection molding machine for supplying molten resin to a hot runner passed inside said lower die; and metering means provided in each of a plurality of valve gates branching off from said hot runner metering said molten resin and supplying said metered molten resin to said corresponding valve gate, wherein said metering means comprises a three-way valve having an outlet end communicated with a corresponding one of said valve gates, a first inlet end communicated with said hot runner, and a second inlet end communicated with variable volume chamber means for storing a prescribed amount of molten resin supplied from said hot runner, in such a manner that said molten resin stored therein is supplied to said valve gate with a synchronized operation of said variably volume chamber means and said three-way valve under a command from a control unit.

12. A device according to claim 11, wherein said valve gates are opened with some overlap between opening periods of at least part of said valve gates.

13. A device according to claim 11, wherein said variable volume chamber means comprises a metering chamber having a cylindrical shape, a piston slidably received in said metering chamber, and actuating means for moving said piston so as to receive molten resin in said metering chamber when said molten resin is being supplied from said hot runner, and push said molten resin out to said valve gate when said molten resin is being supplied from said valve gate into said mold.

14. A device according to claim 11, wherein said metering means is provided with means for varying said prescribed amount.

* * * * *